(12) United States Patent
Fornasier et al.

(10) Patent No.: US 8,808,592 B2
(45) Date of Patent: Aug. 19, 2014

(54) METHOD FOR SHREDDING PORTIONS OF BITUMINOUS MATERIAL INTO RECYCLABLE GRANULES

(75) Inventors: Antonio Fornasier, San Biagio di Callalta (IT); Alessandro Pavan, Lanzago di Silea (IT)

(73) Assignee: Euroline S.r.l., Maserada Sul Piave (IT)

( * ) Notice: Subject to any disclaimer, the term of this patent is extended or adjusted under 35 U.S.C. 154(b) by 904 days.

(21) Appl. No.: 12/863,435

(22) PCT Filed: Jan. 16, 2009

(86) PCT No.: PCT/IB2009/000070
§ 371 (c)(1),
(2), (4) Date: Dec. 13, 2010

(87) PCT Pub. No.: WO2009/090546
PCT Pub. Date: Jul. 23, 2009

(65) Prior Publication Data
US 2011/0084418 A1    Apr. 14, 2011

(30) Foreign Application Priority Data
Jan. 18, 2008   (IT) .............................. TO2008A0047

(51) Int. Cl.
*B02C 13/12*    (2006.01)
(52) U.S. Cl.
USPC .......................................... 264/141; 264/109
(58) Field of Classification Search
USPC .......................................... 264/141, 911, 920
See application file for complete search history.

(56) References Cited

U.S. PATENT DOCUMENTS 4,046,497 A * 9/1977 Newman, Jr. ................. 425/313

FOREIGN PATENT DOCUMENTS

| DE | 100 31 047 | 1/2002 |
| EP | 0 358 858 | 3/1990 |
| EP | 1 236 790 | 9/2002 |
| RU | 31111 U1 | 7/2003 |

OTHER PUBLICATIONS

PCT International Search Report and Written Opinion for PCT Counterpart Application No. PCT/IB2009/000070 containing Communication relating to the Results of the Partial International Search Report, 8 pgs., (Apr. 7, 2010).
Office Action for corresponding Russian Patent Application No. 2010134406/5(048824), 7 pages, (Dec. 18, 2012).

* cited by examiner

*Primary Examiner* — Larry Thrower
*Assistant Examiner* — Xue Liu
(74) *Attorney, Agent, or Firm* — Blakely, Sokoloff, Taylor & Zafman LLP.

(57) ABSTRACT

Described herein is a machine (1) for shredding portions (30) of bituminous material in the solid state into recyclable granules (31) of small dimensions comprising a shredding unit (5), which in turn comprises a perforated tubular body (6), and a pressing member (7) for pushing the portions (30) into the perforated tubular body (6) in such a way as to force the bituminous material by compression to come out through the holes of the perforated tubular body (6) so as to obtain a plurality of substantially filiform extruded portions (33) of the bituminous material, and a cutting member (8) for cutting the extruded portions (33) coming out of the holes of the perforated tubular body (6) in such a way as to obtain the granules (31) of small dimensions.

7 Claims, 5 Drawing Sheets

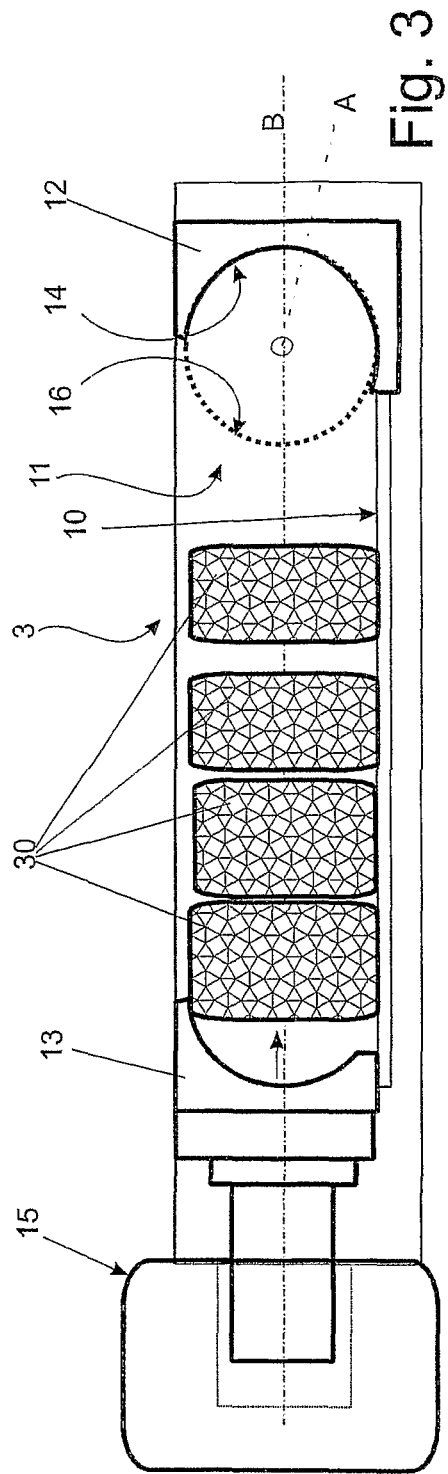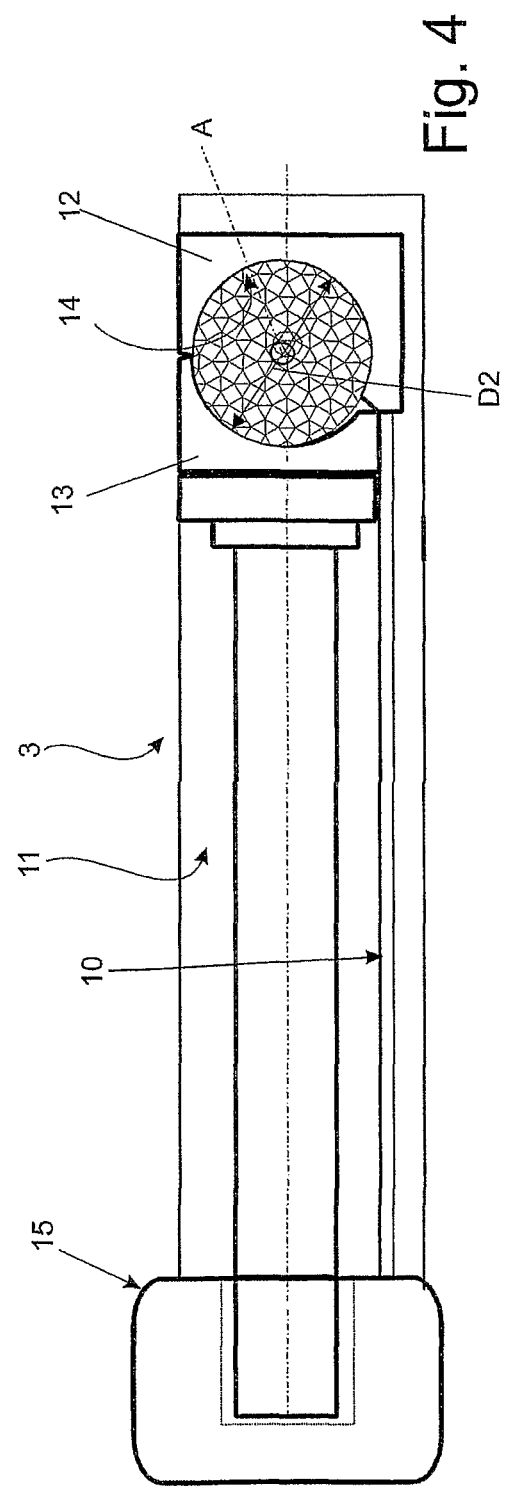

METHOD FOR SHREDDING PORTIONS OF BITUMINOUS MATERIAL INTO RECYCLABLE GRANULES

CROSS-REFERENCE TO RELATED APPLICATIONS

This patent application is a U.S. National Phase application under 35 U.S.C. §371 of International Application No. PCT/IB2009/000070, filed on Jan. 16, 2009, entitled MACHINE AND METHOD FOR SHREDDING PORTIONS OF BITUMINOUS MATERIAL INTO RECYCLABLE GRANULES, which claims priority to Italian patent application no. TO2008A000047, filed on Jan. 18, 2008.

TECHNICAL FIELD

The present invention relates to a machine and a method for shredding portions of bituminous material in the solid state into recyclable granules of small dimensions.

BACKGROUND ART

As is known, in the last few years there has been an increasing need for enabling recycling of the waste bituminous material deriving from the processes of production or use of products made with bituminous materials, such as, for example, bituminous membranes, bituminous films, bituminous tiles, and other bitumen-based materials typically used in the building sector.

For this purpose machines have been devised, which are able to fragment the waste bituminous material into granules of small dimensions, which are then re-used in processes for the production of new bitumen-based products of the type mentioned above.

The fragmentation into granules of the waste bituminous material carried out by the aforesaid machines is currently performed through a so-called "hot process", which basically envisages a step of heating the bituminous waste inside a high-temperature heating chamber in such a way as to obtain a softening of the waste material, which passes from a solid state to a semisolid state, and of feeding the semisolid material thus obtained to a rotating cutting head, which fragments the semisolid waste into semisolid granules. Following upon the aforesaid operations, the semisolid granules are brought into the solid state via a step of cooling thereof.

Methods and machines of the type described above present the technical problem of being far from efficient from the standpoint of energy consumption. In fact, the need to heat the heating chamber and to subsequently cool the semisolid granules requires an absorption of a particularly high electrical power by the machine, said absorption giving rise as a whole to a relatively high consumption of electrical energy.

In addition, in the methods and machines referred to above the fragmentation into granules of the waste bituminous material with a polyester substrate is frequently incomplete. In fact, heating of the polyester layer determines formation of plastic filaments that prove difficult to separate from the rotating head and consequently keep some granules joined together following upon cooling thereof, thus giving rise to bituminous conglomerates of relatively large dimensions.

EP1236790 discloses a method for producing pellets by using waste plastics, as a raw material which is injected into a blast furnace, a cement kiln, or the like.

SUMMARY

The aim of the present invention is hence to provide a method that will be able to shred in a complete and satisfactory way portions of bituminous material in the solid state into recyclable granules, using a reduced electrical power with respect to the electrical power required in the aforementioned methods.

Provided according to the present invention is a method for shredding portions of bituminous material into recyclable granules as specified in claim 1 and preferably, but not necessarily, in any one of the claims that depend either directly or indirectly upon not necessarily, in any one of the claims that depend either directly or indirectly upon claim 1.

BRIEF DESCRIPTION OF THE DRAWINGS

The present invention will now be described with reference to the annexed drawings, which illustrate a non-limiting example of embodiment thereof, and in which:

FIGS. 3 and 4 illustrate the shredding unit of the machine in a first operative position and a second operative position, respectively, according to a cross section I-I of FIG. 2;

BEST MODE FOR CARRYING OUT THE INVENTION

Figure 1:
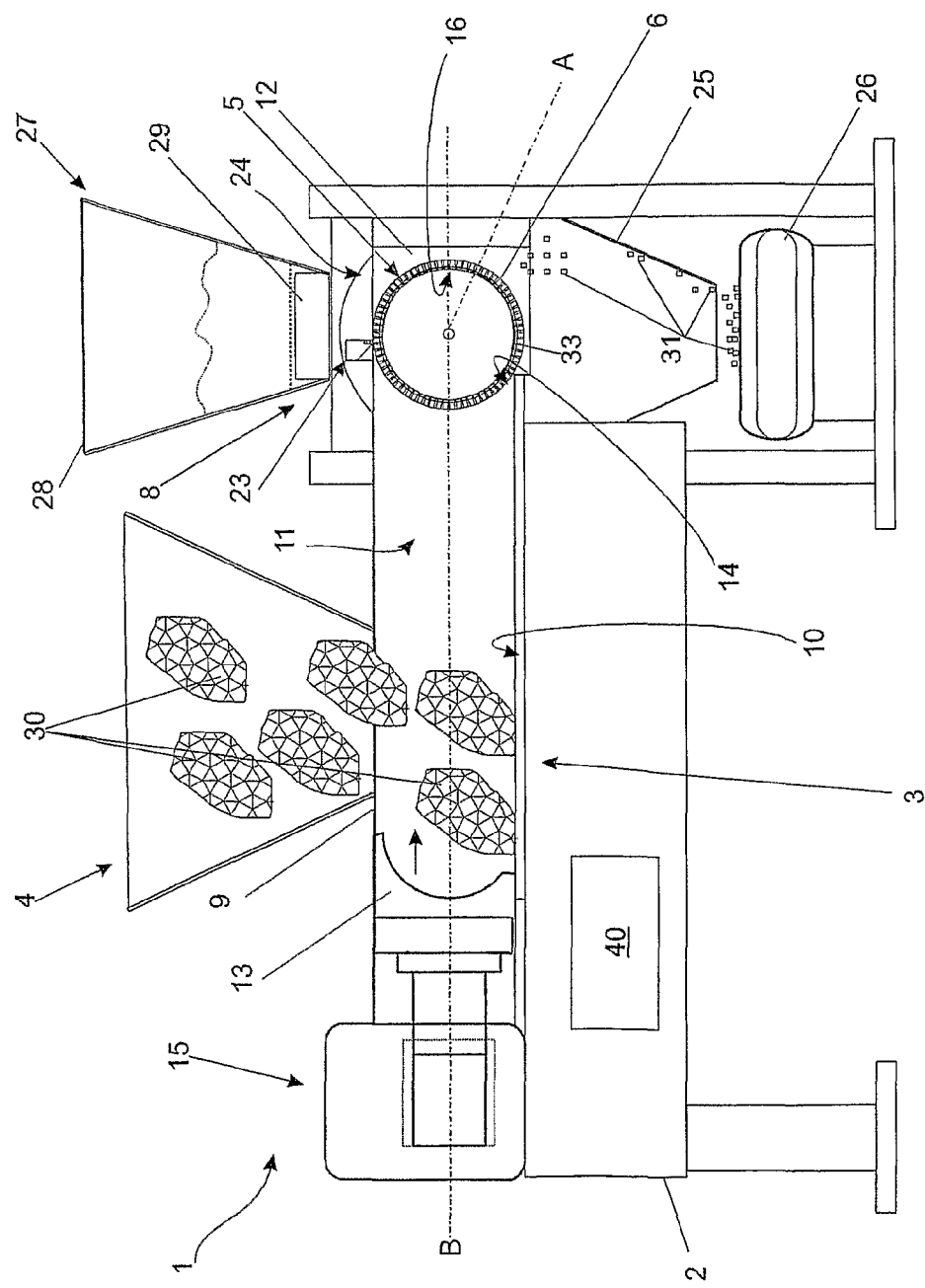
FIG. 1 shows a schematic view in side elevation, with parts in cross section and parts removed for reasons of clarity, of a machine for shredding portions of bituminous material into recyclable granules built according to the teachings of the present invention.

With reference to FIGS. 1 to 7, the reference number 1 designates as a whole a machine designed to shred portions 30 of bituminous material deriving preferably, but not necessarily, from waste bituminous products in the solid state such as, for example, bituminous membranes, bituminous films, bituminous tiles and other similar materials used in the building sector, into recyclable solid granules 31 in successive processes for manufacture of products made of bituminous material.

It should be pointed out that the machine 1 is able to shred not only portions of waste bituminous products, but also complete rolls or sheets of bituminous material or similar materials.

The machine 1 comprises a frame 2 for resting on the ground, a compacting unit 3 set resting upon the frame 2, which is designed to receive the portions 30 fed from a hopper 4 and compresses the portions themselves in such a way as to form a compact agglomerate having a given shape, and a shredding unit 5, set resting on the frame 2, which has the function of "cold shredding" of the agglomerate into granules 31 of small dimensions, through a process of extrusion and cutting described in detail hereinafter.

The shredding unit 5 basically comprises a perforated tubular body 6 (shown in FIG. 2), which extends along a longitudinal axis A, a pressing member 7 for pushing the solid portions 30 into the perforated tubular body 6 in such a way as to force the bituminous material by compression to come out through the holes of the perforated tubular body 6 so as to obtain a plurality of substantially filiform extruded portions 33 of the bituminous material, and a cutting member 8 designed to cut the extruded portions 33 coming out of the holes in such a way as to obtain the granules 31 of small dimensions.

As regards the compacting unit 3, it comprises a box-like body 9 of a substantially parallelepipedal shape, which extends along an axis B transverse to the longitudinal axis A and comprises, in turn, a base plane 10 of a substantially rectangular shape fixedly connected to the frame 2 in a substantially horizontal position, a pair of side containment walls 11, which extend from the outer periphery of the base surface 10 parallel to the axis B in positions facing one another, and a pair of side walls designated by 12 and 13, each of which extends along the outer periphery of the base surface 10 parallel to the longitudinal axis A.

In particular, the side wall 12 is fixedly connected to the base surface 9 in a fixed position, whilst the opposite side wall 13 is mounted mobile along the axis B in such a way as to be able to slide with its own bottom edge resting on the base surface 10 away from and towards the fixed side wall 12 so as to form with the latter and with the containment side walls 11 an variable-volume inner chamber 14.

Figure 2:
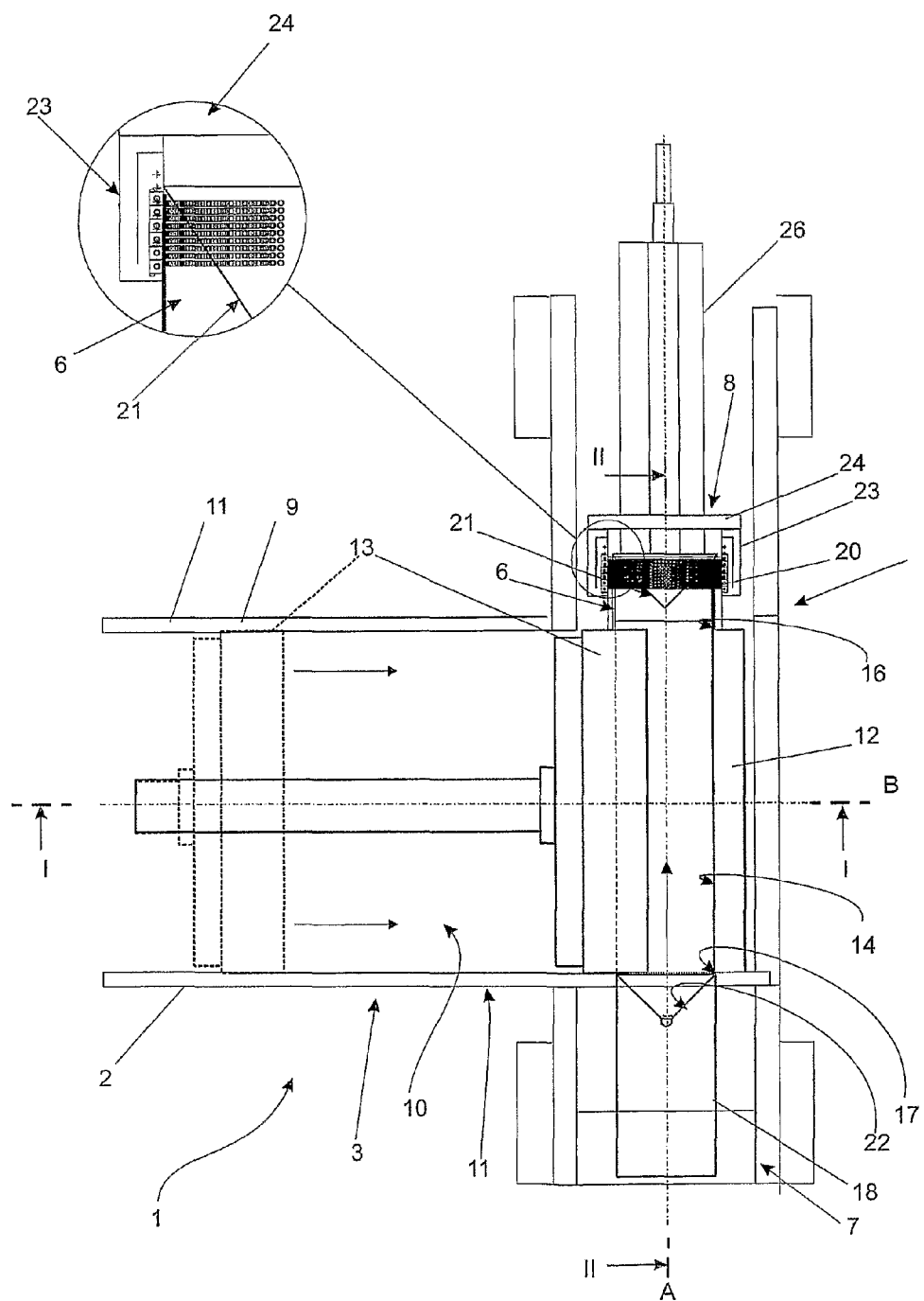
FIG. 2 is a top plan view, with parts in cross section and parts removed for reasons of clarity, of the machine shown in FIG. 1.

The compacting unit 3 is moreover provided with an actuator member 15 comprising a movement mechanism, for example, a linear electric actuator or any other type of similar actuator moved preferably but not necessarily by an electric motor, which is connected to the mobile side wall 13, and is designed, upon command, to displace it between a position for loading the portions (FIGS. 1 and 3), in which the mobile side wall 13 is set in a position corresponding to the peripheral edge of the base surface 10, and a compacting position, shown in FIG. 2 or FIG. 4, in which the mobile side wall 13 sets itself preferably but not necessarily with a top edge thereof bearing upon a corresponding top edge of the side wall 12.

In the case in point, in the loading position, the inner chamber 14 assumes its maximum internal volume for enabling housing inside it of the portions 30 contained in the hopper 4 (FIG. 3), whereas in the compacting position the inner chamber 13 assumes its minimum internal volume so as to form the agglomerate of the portions 30 (FIG. 4).

In the example shown in FIGS. 3 and 4, the two side walls 12 and 13 are shaped in such a way as to present preferably, but not necessarily, the shapes of two half-cylinders having the corresponding concavities facing one another in such a way that, in the compacting position, the inner chamber 14 will present substantially the shape of a cylinder (FIG. 4).

In detail, in the compacting position, the cylinder formed by the inner chamber 14 shares the longitudinal axis A and is open both at a first end so as to communicate, through an opening 16 made in the containment side wall 11, with the inlet of the perforated tubular body 6, and at the opposite end so as to communicate, through an opening 17 made in the containment side wall 11 opposite to the perforated tubular body 6, with the pressing member 7 in order to enable the latter to traverse the inner chamber 14.

Figure 5:
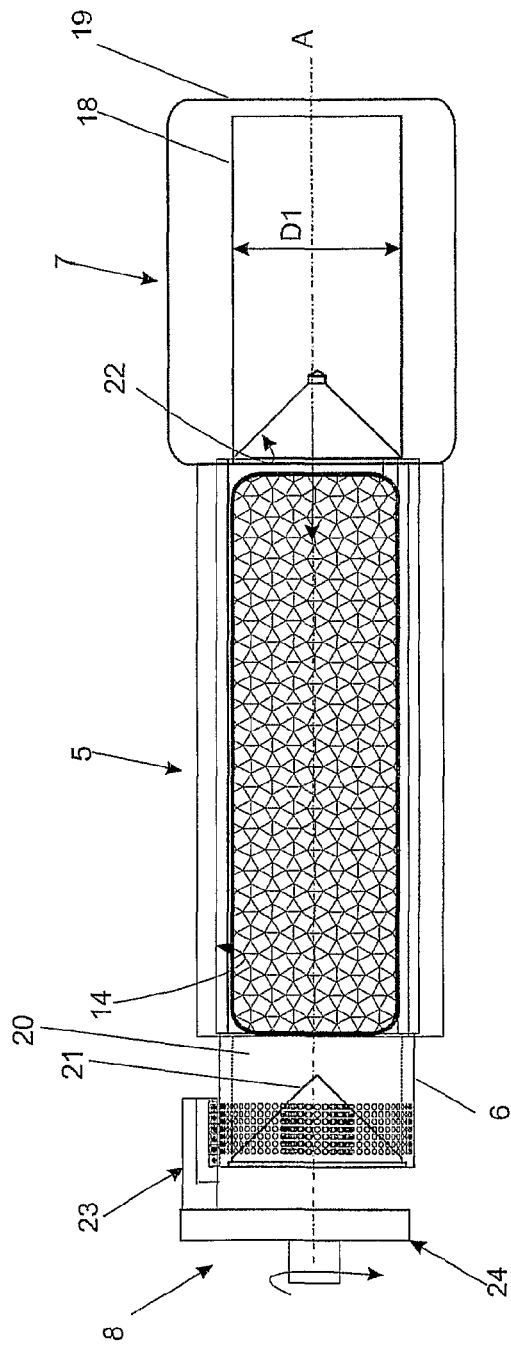
FIGS. 5 and 6 show as many schematic views, with parts in cross section and parts removed for clarity, of the compacting unit of the machine in two different operative conditions according to a cross section II-II of FIG. 2; whilst
Figure 6:
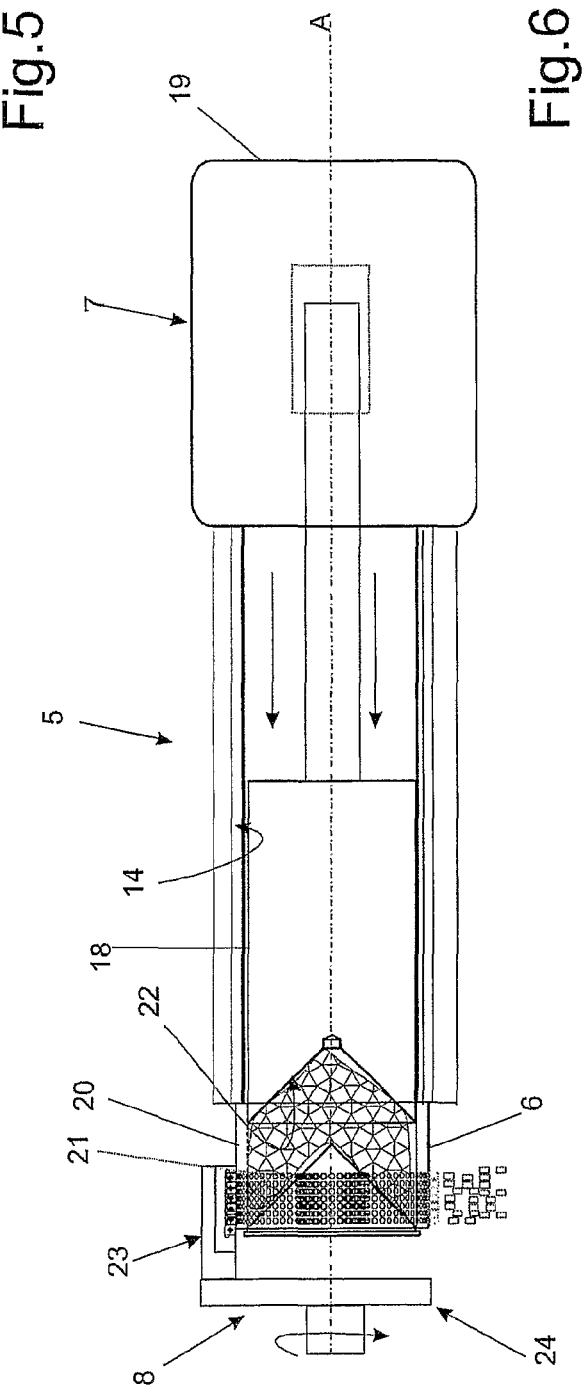

In the example shown in FIGS. 5 and 6, the pressing member 7 basically comprises a piston 18, which is mounted mobile along the longitudinal axis A, and a movement device 19 designed to displace the piston 18 along the longitudinal axis A between a retracted position shown in FIG. 5 and an extracted position shown in FIG. 6, in which the piston 18 extends along the axis A in such a way as to traverse the inner chamber 14 completely until it brings its own free end, i.e., the corresponding head, at least partially within the perforated tubular body 6.

In greater detail, the piston 18 is shaped in such a way that its outer diameter D1 will approximate by defect the inner diameter D2 of the inner chamber 14 defined by the two side walls 12 and 13 in the corresponding compacting position.

As regards the perforated tubular body 6 of the shredding unit 5, it comprises a perforated cylindrical barrel 20 sharing the longitudinal axis A, which is fixedly connected to the box-like body 9 preferably, but not necessarily, through a radiusing tubular element having the same inner diameter as the perforated tubular body 6.

In the example shown in FIGS. 2, 5 and 6, one end of the perforated cylindrical barrel 20 opposite to the box-like body 9, is closed by a projecting portion 21, which is set sharing the longitudinal axis A and is shaped in such a way as to present a shape substantially complementary to a concave portion 22 made in the head of the piston 18.

In greater detail, in the example shown in FIGS. 5 and 6, the projecting portion 21 and the concave portion 22 are each substantially shaped like a truncated cone and are sized in such a way that, when the piston 18 is in the corresponding extracted position, the concave portion 22 of the piston 18 receives inside it the projecting portion 21.

As regards, instead; the cutting member 8, it comprises one or more tools 23, each of which is set resting on the outer side wall of the perforated cylindrical barrel 20 and is designed to turn freely about the longitudinal axis A in such a way as to follow the entire circumference of the perforated cylindrical barrel 20 so as to shred the portions 33 extruded from the perforated cylindrical barrel 20.

The cutting member 8 further comprises a rotating head 24, which is designed to support the tools 23 and is designed to turn them about the longitudinal axis A in such a way as to shred the portions 33 extruded from the perforated cylindrical barrel 20. The rotating head 24 can be driven in rotation by a shaft of a motor unit (not illustrated), such as, for example, an electric motor or any other similar device.

Each tool 23 is connected to the rotating head 24 in such a way as to extend parallel to the longitudinal axis A throughout the length of the perforated portion of the perforated cylindrical barrel 20 and can comprise a series of cutting inserts of a preferably, but not necessarily, rectangular shape.

With reference to FIG. 1 the machine 1 further comprises a chute 25 for unloading the granules 31, which is fixedly connected to the frame 2 underneath the perforated cylindrical barrel 20 so as to be able to convey the shredded granules 31 obtained by cutting to a conveyor device 26, such as, for example, a belt conveyor or an auger conveyor, set in turn with one end at least partially underneath the outlet mouth of the unloading chute 25.

The machine 1 moreover comprises preferably, but not necessarily, a distributor device 27, which is designed to sprinkle the shredded granules preferably, but not necessarily, with calcium carbonate so as to maintain advantageously separation thereof. In the case in point, in the example shown in FIG. 1, the distributor device 27 basically comprises a hopper 28 positioned preferably, but not necessarily, on top of the perforated cylindrical barrel 20, and preferably, but not necessarily, a sifting apparatus 29 set between the unloading mouth of the hopper 28 and the perforated cylindrical barrel 20 for sifting the calcium carbonate before its deposition on the granules 31.

The machine 1 described above is moreover provided with an electronic unit 40 (FIG. 1) that co-ordinates operation of the compacting unit 4 and of the shredding unit 5 according to the method described hereinafter.

There now follows a description of the method for shredding portions of bituminous material into recyclable granules, where the piston 18 is assumed to be initially in its retracted position (FIG. 5), the mobile side wall 13 is in the corresponding loading position (FIG. 3), and the rotating head 24 is turning about the axis A.

The method for shredding the material basically envisages actuating the hopper 4 to feed the portions 30 into the inner chamber 14.

Following upon completion of loading of a certain amount of portions 30 into the inner chamber 14 (FIG. 3), the electronic unit 40 issues a command for reduction of the volume of the inner chamber 14. In this step, the electronic unit 40 issues a command for displacement of the side wall 13 from the loading position to the compacting position, in which the side wall 13 comes to bear upon the side wall 12, thus bringing about compacting of the portions 30 and in this way forming the compact agglomerate (FIG. 4).

Figure 7:
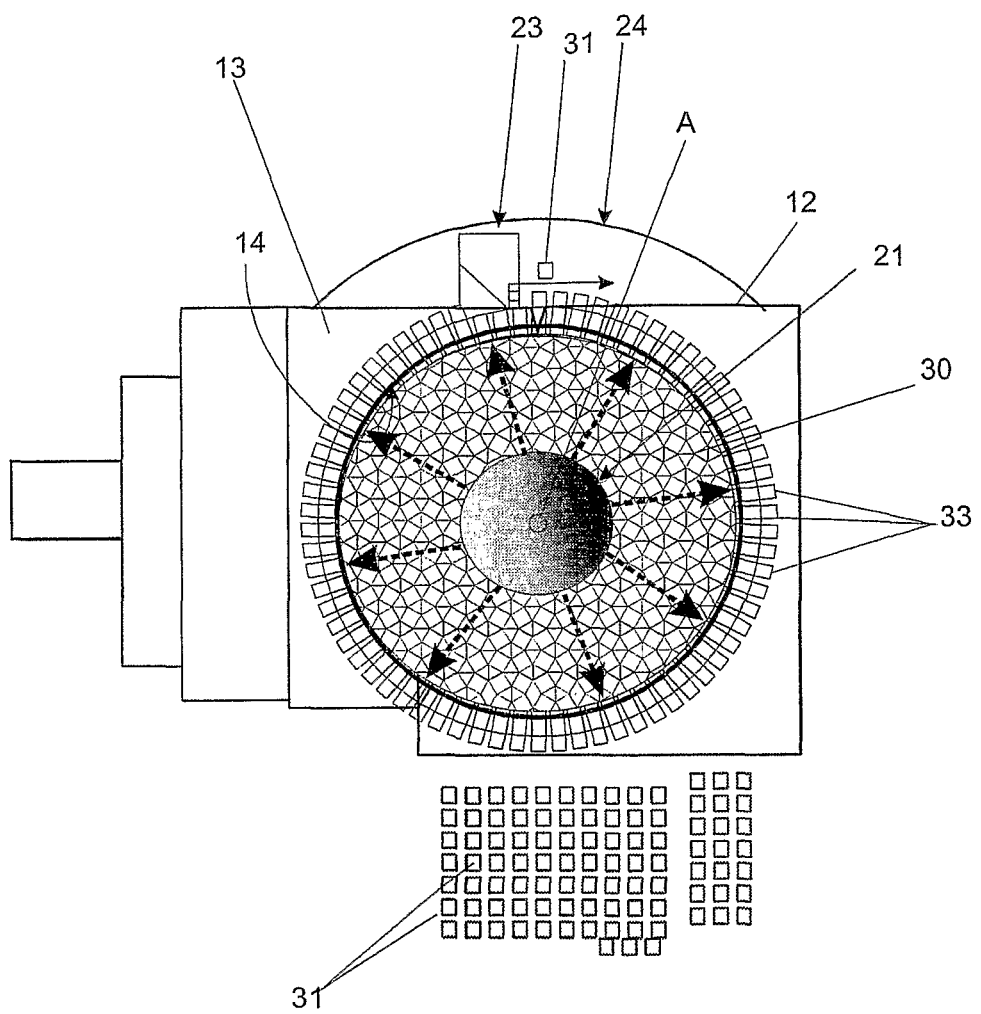
FIG. 7 shows a view in side elevation of the cutting member of the machine shown in FIG. 1.

When the side wall 13 has reached the compacting position, the electronic unit 40 issues a command for advance of the pressing member 9 from the retracted position (FIG. 5) to the extracted position (FIG. 6). In this step, the electronic unit 40 issues a command for advance of the piston 18, which pushes the agglomerated portions 30 into the perforated tubular body 6, forcing the bituminous material by compression to come out through the holes of the perforated tubular body 6 so as to obtain the extruded portions 33 (FIG. 7). In case in point, the longitudinal thrust exerted by the piston 18 on the mass of compacted portions 30 is conveniently converted by the projecting portion 21 shaped like a truncated cone into a radial thrust thereof towards the inner wall of the perforated cylindrical barrel 20, thus bringing about an extrusion of the bituminous material.

In this step, the filiform extruded portions 33 coming out of the holes are cut by the tools 23 to a length of a few millimeters, thus forming the granules 31. Following upon the cutting operation, the granules 31 are deposited, by being dropped, on the conveyor device 26 through the unloading chute 25. During the step of cutting, the granules are sprinkled with calcium carbonate by the distributor device 27.

The machine described above presents multiple advantages. In the first place, the machine is extremely simple to produce and, given that there is no need to heat and/or to cool the bituminous portions or the granules, it requires a lower electrical power, consequently achieving a reduction in energy consumption.

In addition, thanks to the "cold" mechanical cutting performed by the tools on the portions of bituminous material, it is possible to fragment in a complete way also products with bituminous base provided with a polyester substrate without the production of any plastic filament.

Finally, it is clear that modifications and variations may be made to the machine and to the method described and illustrated herein, without thereby departing from the scope of the present invention according to what is set forth in the annexed claims.

The invention claimed is:

1. A method for shredding portions of bituminous material in a solid state into recyclable granules in the solid state, wherein the recyclable granules have dimensions that are smaller than dimensions of said portions of bituminous material, the method comprising:

pushing said portions of bituminous material into a perforated tubular body comprising a perforated cylindrical liner having a longitudinal axis, in such a way as to force the bituminous material by compression to come out through the holes of said perforated tubular body so as to obtain a plurality of substantially filiform extruded portions of said bituminous material; and cutting said extruded portions coming out of said holes of said perforated tubular body in such a way as to obtain granules having dimensions smaller than the dimensions of said portions of bituminous material;

compressing said portions in such a way as to obtain a compact agglomerate set substantially sharing said longitudinal axis;

compressing said portions into a variable-volume chamber, which comprises two side walls set parallel to said longitudinal axis, at a distance from and facing one another; and displacing one of said walls towards the other side wall along an axis substantially transverse to said longitudinal axis.

2. The method according to claim 1, comprising:

setting at least one cutting tool substantially in contact with the outer side wall of said perforated cylindrical liner; rotating said cutting tool about said longitudinal axis for shredding the extruded portions of material coming out of the holes of said perforated cylindrical liner.

3. The method according to claim 1, comprising:

displacing said mobile side wall between a position for loading said portions into said variable-volume chamber, in which the volume of said variable-volume chamber is maximum, and a position for compacting said portions to form said compact agglomerate in said variable-volume chamber, in which said side wall sets itself at least partially bearing upon the other side wall, and the internal volume of said variable-volume chamber is minimum.

4. The method according to claim 3, wherein said side walls are shaped in such a way as to present the shapes of two half-cylinders having the concavities facing one another in such a way that in said compacting position said variable-volume chamber has substantially the shape of a cylinder sharing said longitudinal axis.

5. The method according to claim 4, comprising:

displace a piston between a retracted position outside said variable-volume chamber, and an extracted position, in which said piston extends along said longitudinal axis in such a way as to traverse said variable-volume chamber so as to bring its own head at least partially into said perforated cylindrical barrel.

6. The method according to claim 5, wherein said perforated cylindrical liner comprises an internal projecting portion, which is shaped in such a way as to present a shape substantially complementary to a concave portion made on the head of said piston; said projecting portion sharing said longitudinal axis in such a way as to fit within said concave portion of said piston.

7. The method according to claim 6, wherein said concave portion and said projecting portion are substantially shaped like a truncated cone.

* * * * *